United States Patent

[11] 3,554,139

| [72] | Inventor | Bette J. Rosner<br>6777 E. Pleasant Run Parkway S. Drive,<br>Indianapolis, Ind. 46219 |
|---|---|---|
| [21] | Appl. No. | 808,615 |
| [22] | Filed | Mar. 19, 1969 |
| [45] | Patented | Jan. 12, 1971 |

[54] FOLDING TRAY
2 Claims, 4 Drawing Figs.

[52] U.S. Cl. .................................................. 108/44
[51] Int. Cl. ..................................................... A47b 23/00
[50] Field of Search ............................................ 108/42—49

[56] References Cited
UNITED STATES PATENTS

| 2,601,177 | 6/1952 | Smullen........................ | 108/47UXN |
| 2,792,267 | 5/1967 | Hubbard ...................... | 108/45 |
| 2,741,521 | 4/1956 | Bell, et al...................... | 108/44UXN |
| 2,856,251 | 10/1958 | Garrison....................... | 108/44UXN |
| 3,232,250 | 2/1966 | Hamilton, et al. ............ | 108/44 |
| 3,386,392 | 6/1968 | Gramm ........................ | 108/44 |

Primary Examiner—Bobby R. Gay
Assistant Examiner—Glenn O. Finch
Attorney—Woodard, Weikart, Emhardt & Naughton ABSTRACT: Folding tray which is useful in conjunction with an automobile seat. The folding tray is supported by a pair of opposing hook portions which are adapted to engage the back of an automobile seat. The hook portions are connected to a rectangular framework. The relative height of the tray section is adjustable by means of a pair of opposing pawls which are adapted to engage indents in the rectangular framework.

PATENTED JAN 12 1971 3,554,139

INVENTOR.
BETTE J. ROSNER
BY
Woodard, Weikart, Emhardt & Naughton
ATTORNEYS

FOLDING TRAY

BACKGROUND OF THE INVENTION

Trays for use in conjunction with automobile seats and other automotive components such as doors are widely known in the prior art. They are widely used in, for example, drive-in restaurants. Trays of the subject type are useful in serving food and beverages in drive-in restaurants and as a support for food and beverages which are consumed while the automobile is in motion.

With the advent of modern turnpikes, extended automobile trips have become quite common. During these extended automobile trips for both convenience and economic reasons it is often desirable to eat and drink boxed lunches while the car is in motion or while stopped briefly at a rest center. This invention is concerned with a tray which is adapted to be hooked over the back section of an automobile seat in such a fashion that a convenient eating surface is formed adjacent to the passengers. The tray of this invention is particularly advantageous in that the relative height of the eating surface can be readily adjusted. Likewise, it is a particularly advantageous in that all the components of the tray assembly fold in such a fashion that minimal storage space is occupied by the tray assembly.

As is mentioned above, trays for use in conjunction with automotive components are generally known in the prior art. However, the vast majority of them are disadvantageous in the that either the structural components thereof do not fold upon themselves in such a fashion as to allow the tray to occupy minimal storage space, or the eating surface itself is not adjustable for height. The tray of this invention overcomes both of these difficulties of the prior art.

SUMMARY OF THE INVENTION

This invention is concerned with a tray which is useful in conjunction with an automobile seat. The relative height of the tray is readily adjustable. Likewise, all components of the tray are adapted to be folded back on each other in such a fashion that the tray occupies minimal storage space. The relative height of the tray is controlled by a pair of opposing pawls which engage indents which are an integral part of a rectangular framework.

DESCRIPTION OF THE PREFERRED EMBODIMENT

Figure 1:
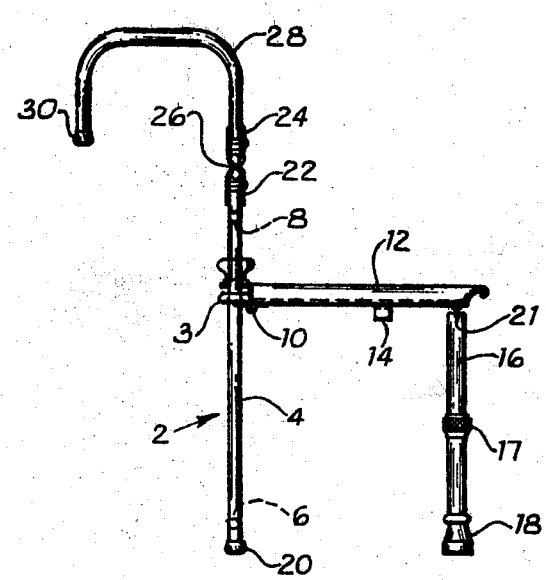
FIG. 1 is a side view of the tray of this invention wherein the parts are shown in an extended condition.
Figure 2:
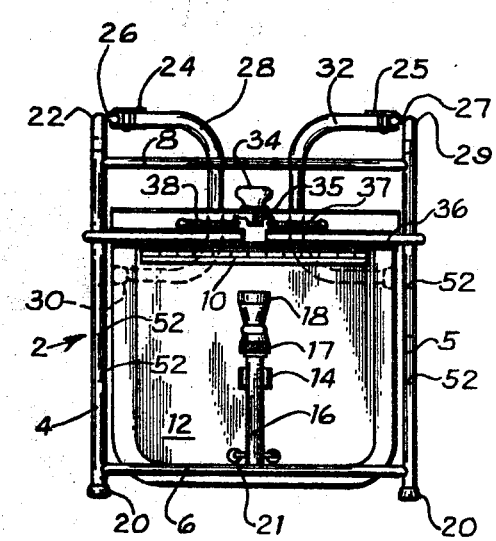
FIG. 2 is a top view of the tray of this invention wherein parts are shown in a folded condition.

Referring to FIGS. 1 and 2, it can be seen that the tray 2 of this invention incorporates a central rectangular framework which is formed by vertical tubular sections 4 and 5 which are connected to horizontal tubular sections 6 and 8. Tubular sections 4, 5, 6 and 8 generally define a rectangle which is adapted to receive a tray section 12. Attached to the upper extremities of tubular sections 4 and 5 are a pair of opposing hook sections 28 and 32 which are adapted to engage the uppermost section of an automobile seat back. Hook sections 28 and 32 are connected to vertical tubular sections 4 and 5 by means of double ball joints 26 and 27. The upper ends of double ball joints 26 and 27 are attached to hook sections 28 and 32 by means of clamps 24 and 25, while the lower ends of double ball joints 26 and 27 are attached to tubular sections 4 and 5 by means of clamps 22 and 29. Because double ball joints are utilized, hook sections 28 and 32 have maximum pivotal freedom around vertical tubular sections 4 and 5. This pivotal freedom is extremely useful when it is desirable to fold hook sections 28 and 32 back upon each other as is illustrated in FIG. 2.

Tray section 12 is attached to vertical tubular sections 4 and 5 by means of a bracket 3 and a hinge 10. Due to the fact that tray section 12 is attached to vertical tubular sections 4 and 5 by means of hinge 10, tray section 12 can be folded back upon vertical tubular sections 4 and 5. The positioning of tray section 12 in this stance is specifically illustrated in FIG. 2. Bracket 3 is adapted to move up and down vertical tubular sections 4 and 5. Tray section 12 is held in a given position relative to vertical tubular sections 4 and 5 by allowing pawls, which are an integral part of bracket 3, to engage indents 52 which are an integral part of vertical tubular sections 4 and 5. The details of bracket 3 will be discussed below.

Tray section 12 is further supported by a telescopic leg 16 which is pivotally connected to tray section 12 via pivot point 21. Telescoping section 16 comprises an outer tubular section and an inner tubular section which are adapted to be locked in relationship to each other. The actual locking of the inner tubular section in relation to the outer tubular section is effected by means of a nut 17. For purposes of storage the telescoping support 16 is adapted to be folded back on tray section 12 and is secured thereto by means of bracket 14. Details of telescoping support 16 will be discussed herein below.

For purposes of preventing these components from scratching articles in which they come into contact with, the ends of hook sections 28 and 32, vertical tubular sections 4 and 5, and telescopic support 16 are covered with crutch tips 18, 20 and 30.

Figure 3:
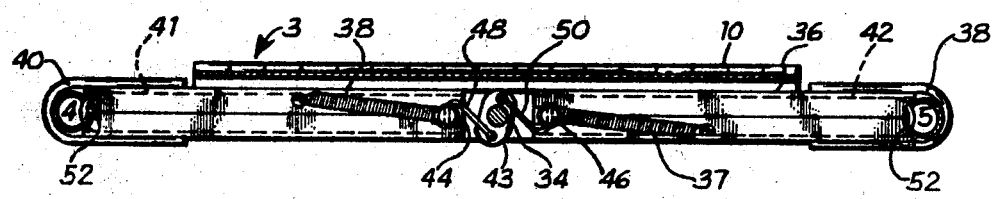
FIG. 3 is a top cutaway view of the bracket which is used in conjunction with this invention.

Specifically referring to FIGS. 2 and 3, it can be seen that bracket 3 comprises a tubular body section 36 having eyelet type end sections 38 and 40.

Positioned on the inner periphery of tubular body section 36 and guided thereby are a pair of opposing pawls 41 and 42 which are adapted to engage vertical tubular sections 4 and 5. Pawls 41 and 42 are biased into indents 52 which are an integral part of vertical tubular sections 4 an 5 by means of a pair of opposing expansion springs 37 and 38 which are connected to pawls 42 and 44 at pivot points 44 and 46. Expansion springs 37 and 38 are connected to tubular body section 36 under a slight tension. Due to this tension, exerted at pivot points 44 and 46, springs 37 and 38 bias pawls 41 and 42 outwardly in such a fashion that the outermost extremities of the pawls 41 and 42 engage indents 52.

Further connected to tubular body section 36 is a hand-turning knob 34 which is in turn connected by shaft 35 to pivot arm 43. The opposing ends of pivot arm 43 are connected to pivot points 44 and 46 by means of flexible linkage arms 48 and 50.

When hand-turning knob 34 is rotated, shaft 35 likewise rotates in such a fashion that pivot arm 43 is rotated. The rotation of pivot arm 43 further causes tension to be applied to flexible linkage arms 48 and 50, in such a fashion that springs 37 and 38 are further expanded. Likewise, when tension is applied to flexible linkage arms 48 and 50, pawls 41 and 42 are caused to move inwardly towards central shaft 35 in such a fashion that the outermost extremities of pawls 42 and 44 are no longer in contact with indents 52 which are an integral part of vertical tubular sections 4 and 5. When contact is lost between pawls 41 and 42 and indents 52, it is possible to move tray section 12, by means of bracket 3, up and down on vertical tubular sections 4 and 5. When tray section 12 is positioned at a desired height, tension is removed from turning knob 34 in such a fashion that the relative positioning of pawls 41 and 42 is controlled by springs 37 and 38. When springs 37 and 38 are allowed to exert a force on pawls 41 and 42 these pawls again proceed in an outwardly fashion in such a manner that they are again caused to engage indents 52 which are an integral part of vertical tubular sections 4 and 5.

Once a desired height is selected for tray section 12, further support is provided by means of telescoping tubular section 16. That is, the relative length of tubular section 16 is adjusted until crutch tip 18 contacts a rigid support which is usually the bottom section of an automobile seat.

From the above description, it can be seen that the relative height of tray section 12 can be readily adjusted on vertical tubular sections 4 and 5. To adjust the height of the tray section 12, all that need be done is rotate turning knob 34, lift or lower tray 12 to a desired height and readjust tubular section 16 in such a fashion as to provide frontal support for tray section 12.

Figure 4:
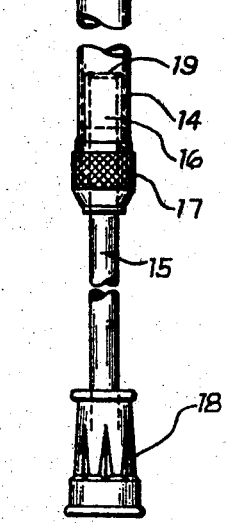
FIG. 4 is a cutaway side view of the adjusting leg which is used in conjunction with this invention.

FIG. 4 further illustrates that telescoping tubular section 16 consists of an outer tubular member 14 and an inner tubular member 15. The relative positioning of tubular members 14 and 15 with respect to each other is controlled by locking nut 17. The movement of inner tubular member 15 on the inner periphery of outer tubular member 14 is controlled by bushing 19 which is securely attached to the end of inner tubular member 15. The overall telescoping tubular section 16 is attached to tray section 12 by means of pivot point 21.

It is apparent that all that need be done to prepare the tray of this invention for storage is retract tubular section 16, lower tray section 12 on hinge 10 until the plane of tray section 12 is roughly parallel with the axis of vertical tubular sections 4 and 5, and fold hook sections 28 and 32 down onto tray section 12 by means of double ball joints 26 and 27. When these component parts are folded in this manner the composite tray 2 of this invention occupies minimal storage space and is adapted to be stored in, for example, an automobile trunk or under the front seat of an automobile.

I claim:

1. A tray assembly comprising a rectangular framework which is formed by two pairs of opposing tubular sections, a pair of opposing hook sections pivotally attached to the upper extremities of said rectangular framework, said hook sections being adapted to engage the back of an automobile seat and further pivotally attached to said rectangular framework is a tray which is movably attached to a pair of opposing vertical sections of said rectangular framework in such a fashion that the relative height of said tray can be adjusted, the tray is attached to a pair of opposing vertical segments of said rectangular framework by means of a bracket assembly having a pair of spring biased pawls positioned from the inside thereof wherein said opposing pawls are adapted to engage indents which are an integral part of the vertical sections of said rectangular framework.

2. A tray assembly comprising a rectangular framework which is formed by two pairs of opposing tubular sections, a pair of opposing hook sections pivotally attached to the upper extremities of said rectangular framework, said hook sections being adapted to engage the back of an automobile seat and further pivotally attached to said rectangular framework is a tray which is movably attached to a pair of opposing vertical sections of said rectangular framework in such a fashion that the relative height of said tray can be adjusted, further frontal support is provided for said tray by means of a telescoping tubular section which is pivotally attached to said tray, wherein said hook sections are pivotally attached to said rectangular framework by means of double ball joints and wherein said tray is attached to a pair of opposing vertical segments of said rectangular framework by means of a bracket assembly having a pair of spring biased pawls positioned on the inside thereof, wherein said opposing pawls are adapted to engage indents which are an integral part of the vertical sections of said rectangular framework.